United States Patent [19]

Sander et al.

[11] Patent Number: 4,972,350

[45] Date of Patent: Nov. 20, 1990

[54] POSITION MODE TRACK SEEK SERVO FOR HIGH CAPACITY DISK DRIVE SYSTEM

[75] Inventors: Ingolf Sander, Cupertino; Jerome F. Richgels; John C. Kuklewicz, both of Sunnyvale, all of Calif.

[73] Assignee: Literal Corporation, Colorado Springs, Colo.

[21] Appl. No.: 358,921

[22] Filed: May 26, 1989

[51] Int. Cl.$^5$ .............................................. G11B 21/10
[52] U.S. Cl. .................................... 369/44.28; 369/32
[58] Field of Search ............... 369/32, 44.28, 44.25, 369/44.34; 360/78.09, 78.07, 78.06, 78.08

[56] References Cited

U.S. PATENT DOCUMENTS

| 4,607,358 | 8/1986 | Maeda et al. | 369/44.28 |
| 4,627,038 | 12/1986 | Abed et al. | 369/44.28 |
| 4,627,039 | 12/1986 | Meyer | 369/44.28 |
| 4,745,587 | 5/1988 | Maeda et al. | 369/44.28 |
| 4,858,214 | 8/1989 | Baba | 369/32 |

*Primary Examiner*—Donald McElheny, Jr.
*Attorney, Agent, or Firm*—Steven F. Caserza

[57] ABSTRACT

During the arrival phase of long seeks, e.g. the last six tracks of a seek, and during the entirety of relatively short seeks, e.g. seeks of less than 256 tracks, position mode servo control is employed by locking an actual tracking error feedback signal to a microprocessor-synthesized reference tracking error signal. The position mode servo feedback loop employs a parallel combination of a synchronous demodulator and a phase-frequency detector to achieve good locking performance over the entire frequency spectrum of the synthesized reference tracking error signal.

7 Claims, 4 Drawing Sheets

POSITION MODE TRACK SEEK SERVO FOR HIGH CAPACITY DISK DRIVE SYSTEM

FIELD OF THE INVENTION

This invention relates to apparatus and a method for positioning a read/write head of a magneto-optical disk drive system during track seek operation.

BACKGROUND OF THE INVENTION

In random access information storage disk drive systems, it is conventional to provide two basic operating modes of servo control for positioning the read write head over the data tracks of the disk: track seek (or access) mode and track following mode. In the track seek mode, the head is moved rapidly over the tracks from the current track at the beginning of the seek to a target track determined from information provided by the host computer. Once at or near the target track, the system is switched to the track following mode in which the head is controlled to maintain the optical beam centered on the data track of then current interest.

During track seek, the objective is to move the head to the target track in as short a time as possible, typically through a predetermined acceleration/deceleration profile, such that the head arrives or lands at the target track with zero velocity. The seek can be as short as a single track, i.e. movement to the adjacent track, or as long as the maximum number of data tracks on the disk which typically can be as much as 10,000 or more tracks away in existing high capacity optical and magneto-optical disk drives.

In high capacity magnetic disk drive systems, it is conventional to use dedicated servo signals as inputs to the servo system for calculation of head velocity or position which is used to control the head positioning apparatus. These servo signals may be located in separate dedicated servo tracks or dedicated sectors of data tracks or may even be embedded in the data tracks themselves. An advantage of this approach is that good, clean servo signals are available to give unambiguous input data to the servo system. However, with the advent of higher capacity optical and magneto-optical drive systems, disk real estate is generally not available for prerecorded servo signals. Accordingly, in such optical and magnetooptical drive systems, servo input is typically derived from a tracking error signal produced from diffraction of the optical read/write beam caused by the transitions between the track grooves and adjacent land areas between the grooves. This tracking error signal appears as a sinusoidal wave signal as the head traverses across the tracks with the zero-crossing points on the wave corresponding to the transitions between data track grooves and adjacent land areas.

Calculation of head velocity from the tracking error signal in an optical or magneto-optical disk drive system is not as accurate as can be accomplished with dedicated servo signals due to inherently low signal-to-noise ratio and to signal corruption caused by perturbations on the disk surface. As a consequence, continuous velocity control throughout seek to the target track is not practical and a sampled servo system is usually preferred. Unfortunately, however, at low head velocity, such as is encountered at the end of seek when the head is arriving at the target track, the sampled feedback is too coarse to indicate with accuracy when the head has reached the target track where it is desired to change from velocity mode to position mode to initiate track following control. Consequently, it is desirable to have a system in which position mode control is initiated well in advance of arrival at the target track so as to bring the head to rest accurately over the target track with a high degree of reliability.

SUMMARY OF THE INVENTION

Thus, in accordance with the invention, a track seek servo system is provided for moving the head of an optical or magneto-optical disk drive during a seek operation to a target track of an information storage disk on which data is recorded on data tracks comprised of substantially concentric grooves separated by raised land areas. The servo system comprises sensing means included in the head for generating an actual tracking error signal derived from transitions between the data grooves and intervening land areas and which is representative of actual movement of the head relative to the data tracks. According to a particular feature of the invention, means are provided, for example in the disk drive controller microprocessor, for synthesizing a separate reference tracking error signal corresponding to a tracking error signal which would be generated by the sensing means with the head moving in a desired profile of position versus time across a predetermined number of tracks, the reference tracking error signal having at least one segment of monotonically decreasing frequency representing a desired slowing of head movement across a contiguous series of tracks adjacent the target track at the end of the seek operation.

The seek servo system is further provided with a synchronous demodulator means responsive to the actual and synthesized reference tracking error signals for generating a first position error signal representative of deviation in actual position of the head from the desired position represented by the reference tracking error signal. The servo system is still further provided with phase-frequency detector means also responsive to the actual and reference tracking error signals and which is primarily effective during the low frequency portion of the reference tracking error signal for generating a second position error signal representative of deviation in actual position of the head from the desired position represented by the reference tracking error signal. The system further includes means for combining the first and second error signals and means responsive to the combined error signals for controlling the position of the head to conform to the desired position as represented by the reference tracking error signal.

DETAILED DESCRIPTION

Figure 1:
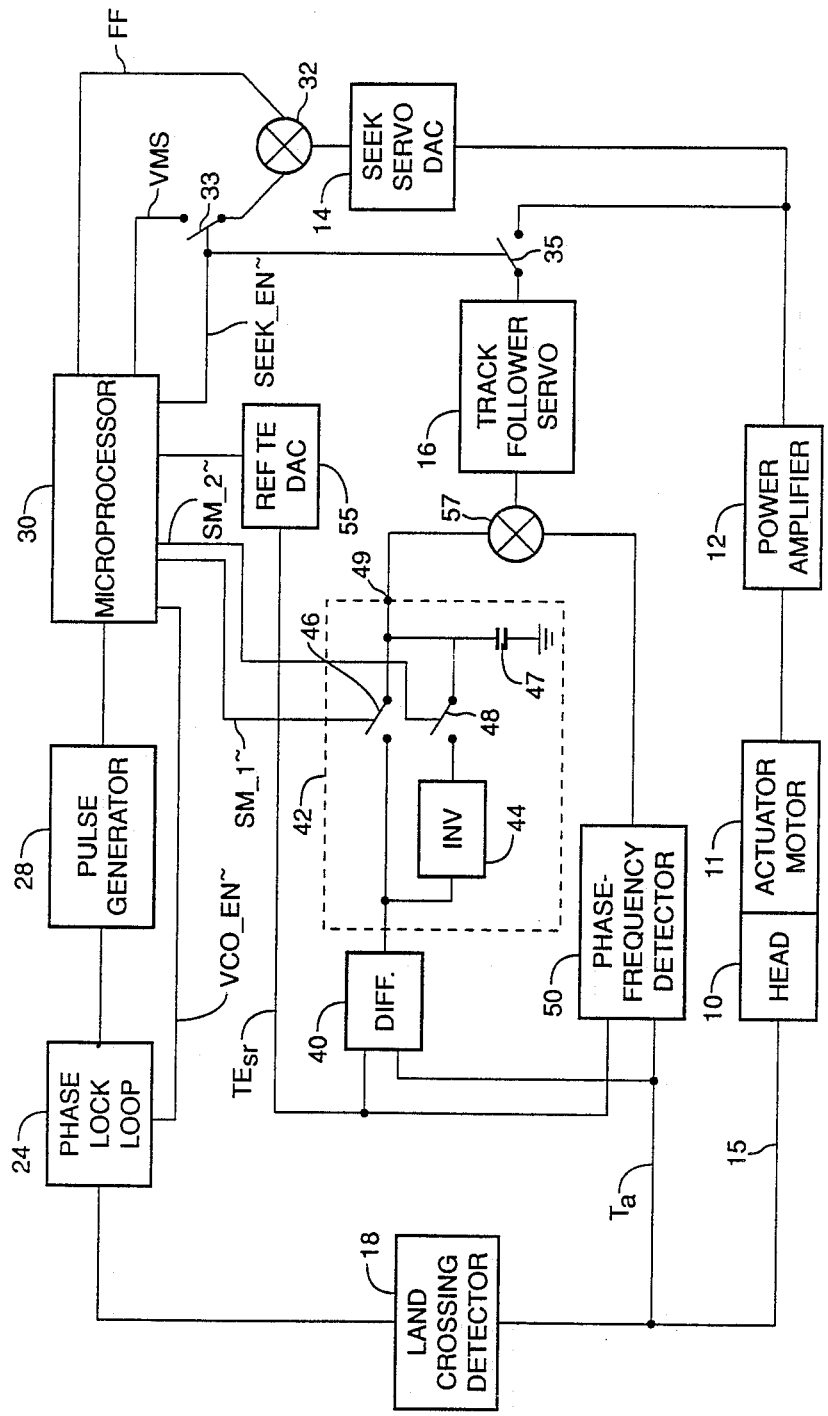
FIG. 1 is a partly schematic block diagram of a disk drive head positioning servo system embodying the seek servo system of the present invention.

Referring now to FIG. 1, a disk drive head positioning servo control system is shown which includes the track seek servo system of the present invention. Considering generally the head positioning servo control system, an optical or magneto-optical head 10 is coupled to actuator motor 11 which operates to move head 10, as required, to position and hold a read or read/write optical beam on a desired data track of an information storage disk (not shown). The driving current for actuator motor 11 is provided by power amplifier 12 which derives its control input from seek servo digital-to-analog converter (DAC) 14 and tracking servo 16. The contribution of DAC 14 and/or servo 16 to the control of the positioning of head 10 depends on the function being performed at any given time, i.e. track seek or track following.

Included in head 10 is conventional sensing means for generating an actual tracking error signal in well known manner from transitions between concentric data grooves and intermediate land areas on the storage disk, the tracking error signal being representative of actual movement of the head relative to the data tracks. This tracking error signal is coupled by line 15 to the input of a land crossing detector circuit 18 which is essentially a zero-crossing detector circuit adapted to produce an output pulse each time the head crosses a land between data tracks on the storage disk. The actual tracking error signal derived in head 10 is also applied to the inputs of a difference circuit 40 and a phase-frequency detector circuit 50 for reasons which will be discussed later in connection with a description of the position mode track seek servo system of the present invention.

The pulse train output of land crossing detector 18 may have gaps in the train resulting from corruption of the actual tracking error signal caused by disk surface imperfections or the head passing over mirror areas on the disk which temporarily prevents the tracking error signal sensor in the head from reliably sensing transitions between data grooves and land areas. To compensate for this, the output pulse train from detector 18 is applied to the input of a phase lock loop circuit 24 which generates a sawtooth ramp function at a frequency which is locked in phase with the fundamental frequency of the pulse train from land crossing detector 18. The output of PLL 24 is applied to pulse generator 28 which converts the sawtooth ramp function signal to a train of pulses which is then coupled to the drive controller microprocessor 30. As is well known in electronic servo control systems, PLL 24 functions in the nature of an electronic flywheel to continue the production of land crossing output pulses in generator 28 even when input pulses are temporarily missing from the output of land crossing detector 18. The pulse train from generator 28 is applied to microprocessor 30 to control an event counter and an interval timer in a manner to be described.

Figure 2:
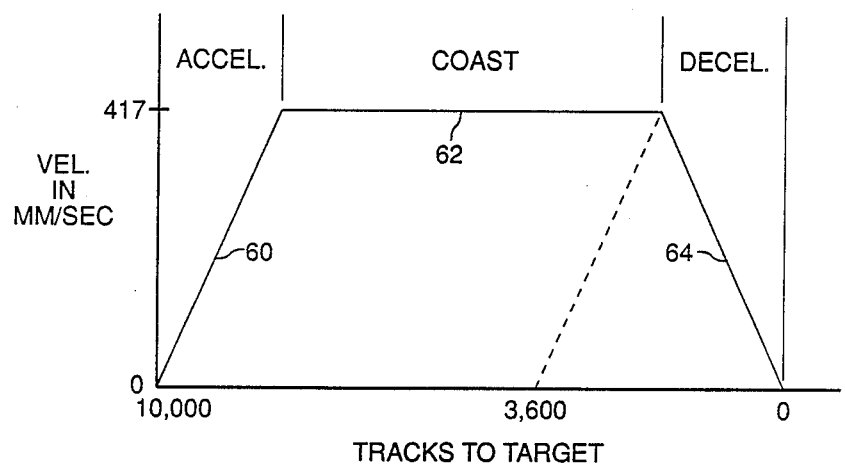
FIG. 2 is a graph illustrating a typical velocity seek profile useful in explaining the operation of the present invention.

As needed during seek operations, feed forward (FF) head acceleration and deceleration digital drive values are generated in microprocessor 30 and applied via combining circuit 32 to DAC 14 where they are converted to analog voltage signals for application to the input of power amplifier 12 to generate predetermined acceleration and deceleration drive currents for actuator motor 11. A digital velocity mode seek (VMS) error value is generated in microprocessor 30 in response to feedback information in the the tracking error pulse train from generator 28. This VMS error value is applied via solid state switch 33 to another input of combining circuit 32 to modify the feed forward acceleration value, as needed, to maintain the velocity of head 10 during velocity mode seek within a desired range to conform to a predetermined velocity profile stored in microprocessor 30, an example of which is illustrated in FIG. 2. The resultant output value from combining circuit 32 is converted in DAC 14 to an analog voltage used to generate the desired driving current in power amplifier 12 for use by actuator motor 11 in controlling the movement of head 10. Control signals SEEK—EN~ and VCO—EN~ generated at appropriate times in microprocessor 30 are applied, respectively, to a solid state switch 33 and to a voltage controlled oscillator in PLL 24 to enable operation of the velocity mode feedback loop as just described and to disable the velocity mode loop when the seek servo switches to the position mode seek of the present invention.

Figure 5:
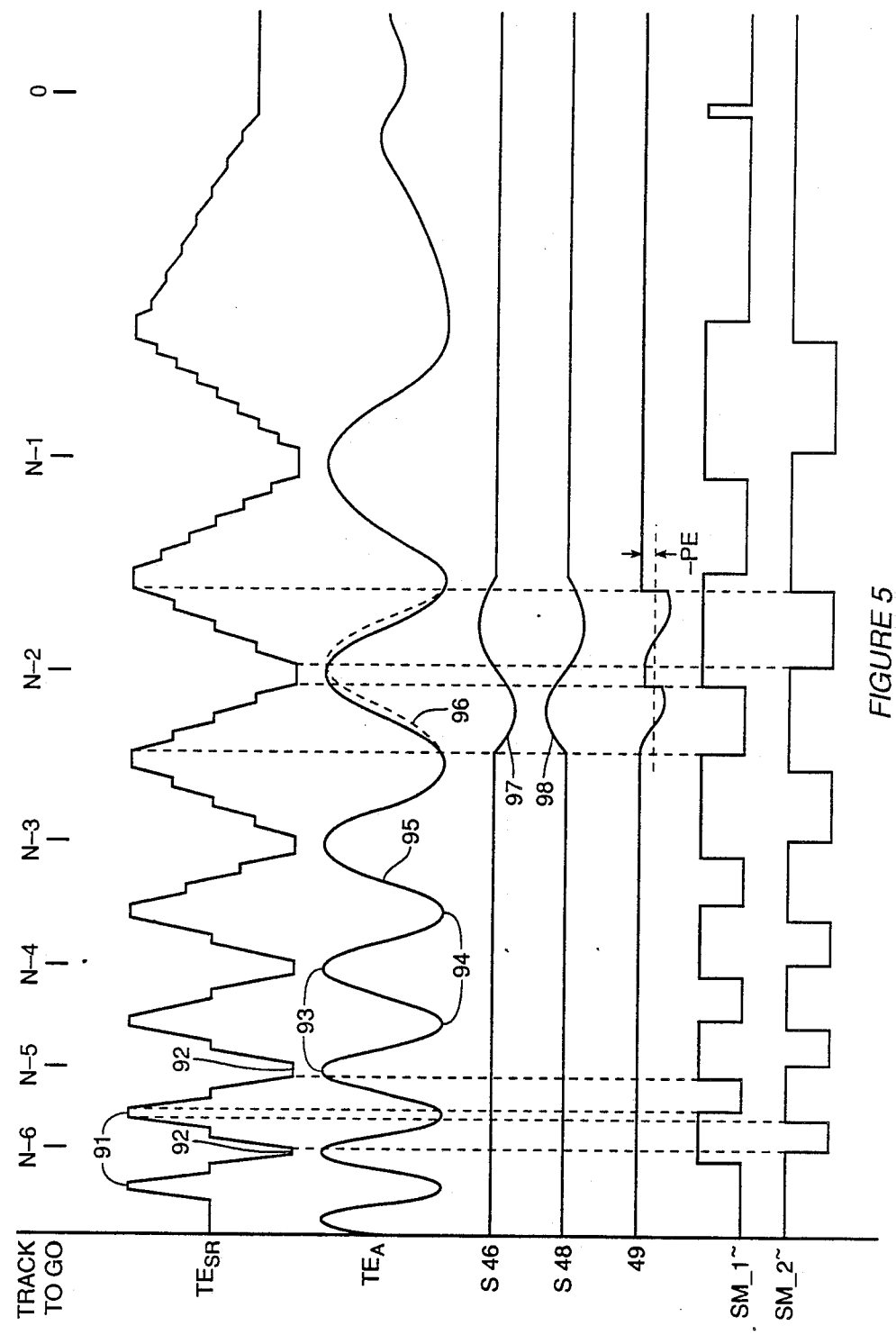
FIG. 5 is a graph of signal waveforms at various points in the servo system of FIG. 1 useful in explaining the method of operation of the present invention.

There will now be considered that portion of the drive servo control which is effective, in accordance with the invention, to provide position mode seek control of head 10 during either the arrival phase at the end of a long seek or throughout the entirety of a short seek, i.e. a seek less than a predetermined number of tracks, e.g. 256 tracks in an actual embodiment. Thus for this purpose, the actual tracking error signal from head 10 is applied simultaneously to respective first inputs of difference circuit 40 and phase-frequency detector circuit 50. In accordance with an important feature of the invention, a reference tracking error signal, $TE_{sr}$ in FIG. 5, is synthesized from digital values generated in microprocessor 30 and converted to an analog signal by reference tracking error DAC 55. The synthesized reference tracking error signal corresponds in frequency and phase to a tracking error signal which would be generated by sensing means in head 10 with the head moving in a desired profile of position versus time across a predetermined number of tracks on the storage disk. Preferably the reference tracking error signal includes at least one segment of monotonically decreasing frequency representing a desired slowing of head movement across a contiguous series of tracks adjacent the target track at the end of a seek operation, partcularly in the case of a long seek operation. For a short seek operation, e.g. less than 256 tracks, the reference tracking error signal corresponds in frequency and phase to desired profile of head movement throughout the entire seek operation.

This reference tracking error signal is applied simultaneously to respective second inputs of difference circuit 40 and phase-frequency detector 50. The applied actual and synthetic reference tracking error signals are then differenced in circuit 40 and the resultant output applied to a synchronous demodulator 42 wherein there is generated a first position error signal representative of any deviation in actual position of head 10 from the desired position represented by the reference tracking error signal. In synchronous demodulator 42, the output of difference circuit 40 is applied directly to a solid state switch 46 and, in parallel, through an inverter circuit 44 to solid state switch 48. Timed switching signals SM—1~ and SM—2~ are generated in microprocessor 30 and coupled to switches 46 and 48, respectively, to generate a dc error voltage with a polarity dependent on the direction of phase error between the actual and reference tracking error signals.

Simultaneously, phase-frequency detector 50 is responsive to the reference and tracking error signals at its inputs to generate a second position error signal representative of deviation in actual position of head 10 from the desired position as represented by the reference tracking error signal. The outputs of synchronous demodulator 42 and phase-frequency detector 50 are combined in adder circuit 57 and coupled to the input of conventional tracking servo circuit 16 to provide a closed loop feedback which locks the moving position of head 10 to the desired position represented by the reference tracking error signal generated by microprocessor 30 and reference tracking error DAC 55.

Velocity Mode Seek

The generalized operation of the track seek servo system of FIG. 1 will now be considered in conjunction with an exemplary velocity profile of a long seek as shown in FIG. 2. In the case of long track seeks of, for example, 256 tracks or more, head 10 is moved across the data tracks at different velocities generally following the velocity profile of FIG. 2 which is initiated with a constant acceleration phase corresponding to linearly increasing velocity segment 60 and ends with a constant negative acceleration (deceleration) phase corresponding to linearly decreasing velocity segment 64. For seeks greater than some intermediate number, such as 3600 tracks, the acceleration drive current is reduced to zero when the head reaches a predetermined terminal velocity, e.g. 417 mm/sec, and the head is allowed to coast with a generally constant velocity during this coast phase as represented by segment 62 of the FIG. 2 profile. The acceleration and deceleration drive currents used to achieve the linearly increasing and decreasing velocity profiles of segments 60 and 64 are determined by the aforementioned feed forward (FF) values generated in microprocessor 30.

In order to provide a degree of control over the drive of head 10 to assure that it is following the desired velocity profile, at least within an acceptable range of deviation, the servo loop comprised of land crossing detector 18, PLL 24, pulse generator 28, microprocessor 30 and seek servo DAC 14, employs a pseudo-sampled form of velocity feedback, meaning that the actual velocity information derived from the tracking error signal at the output of pulse generator 28 is not continuous. As previously mentioned, it is not feasible to use continuous velocity feedback control in the system of the type described due to the generally poor quality of the actual tracking error signal from head 10. With this pseudo-sampled velocity feedback, actual velocity is determined by measuring the time interval between track crossings while the head is moving across the disk surface, as represented by the period between pulses from pulse generator 28.

Figure 3:
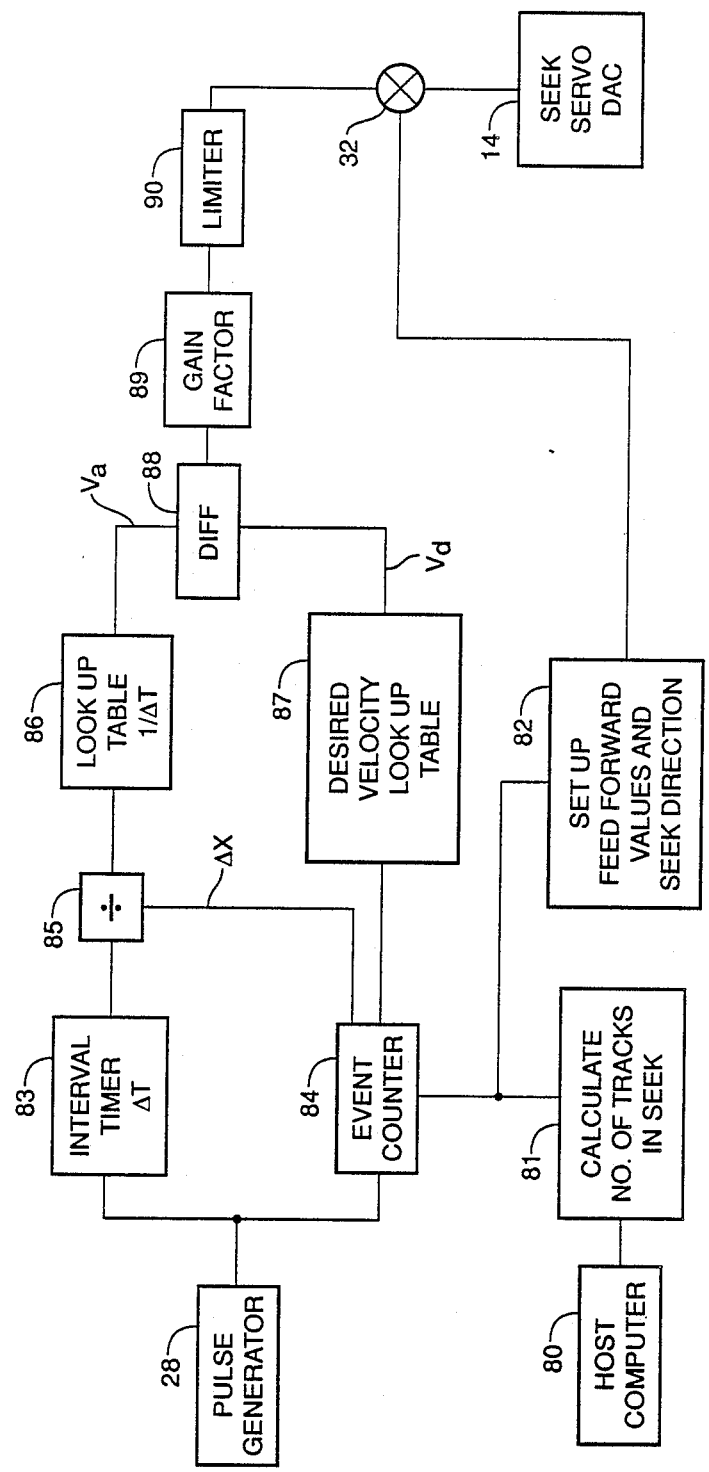
FIG. 3 is a schematic representation of the algorithm performed in the microprocessor of the seek servo system of the invention and which is useful in describing the method of operation of the present invention.

Referring to FIG. 3, there is shown in schematic form the algorithm performed in microprocessor 30 for developing the pseudo-sampled velocity feedback information. In a typical seek operation, the desired target track address supplied from the host computer 80 is used at 81 to calculate the difference between the current track and the target track to determine the number of tracks involved in the seek. The target track address is also used to determine the direction of the seek, i.e. radially inward or outward of the center of the disk. With this information, the microprocessor sets up the acceleration and deceleration feed forward values which are stored in registers in the microprocessor before any head movement begins.

Due primarily to the fact that the phase lock loop circuit 24 requires a minimum number of input land crossing pulses from detector 18 to phase lock onto the pulses, microprocessor 30 determines if the seek is greater than this predetermined number, e.g. 256 tracks in an actually constructed embodiment, and, assuming it is, outputs the digital FF value of acceleration to the servo DAC 14 to start the head moving.

At the beginning of the seek, interval timer 83 is started and event counter 84 is enabled. Counter 84 has been initially loaded by 81 with a negative count corresponding to the number of tracks to go in the seek and, once enabled, is incremented each time a land crossing pulse is received from pulse generator 28. Consequently, event counter 84 keeps a running tally of the number of tracks left to go to the target track as the head moves across the disk surface. When the counter overflows (reaches a count of zero), the head has reached the target track.

At the beginning of each microprocessor sample, once the head movement has commenced, a land crossing pulse from pulse generator 28 causes interval timer 83 to be read, the reading stored away and the timer reset to 0 to begin timing for the next sample. At the same time, the incoming land crossing pulse from generator 28 causes the event counter 84 to be read and subtracted from the previous event counter value to get a $\Delta x$ value representing the number of tracks crossed since the last sample. The interval timer value $\Delta T$ is then divided at 53 by $\Delta x$ to get the time interval for one track crossing 1 $\Delta T$. This value is used to access the actual velocity lookup table 86 which returns a scaled value $V_a$.

The new difference value residing in event counter 84 representing the number of tracks to go to target is used to access the desired velocity lookup table 87 which returns a scaled value $V_d$ representing the desired velocity value for that particular difference to the target track. The lookup table used for this purpose may be conventionally generated by using the known square root switching curve:

$$V_d = \sqrt{2A(X_f - X_s)}$$

where:

$V_d$ = desired velocity
A = acceleration
$X_f$ = current track
$X_s$ = target track
X is in millimeters The actual velocity value from lookup table 86 is then subtracted at 88 from the desired velocity value from lookup table 82 to get the preliminary velocity error. The result is multiplied by a predetermined gain factor at 89. The magnitude of this velocity error value is clamped by the limiter 90, and is output to servo DAC 32 where the computed digital value is converted to an analog voltage for application to power amplifier 12 which, in turn, generates the corresponding driving current for actuator 11, all in known manner.

After all calculations are made, the operation of microprocessor 30 returns to the beginning of the velocity mode calculation loop and waits for the next land crossing pulse from pulse generator 28. This process iterates continuously until the end of the velocity mode and the beginning of what may be referred to as the "arrival phase" at which time the system switches to a position mode of operation. It may be noted with reference to FIG. 2 that the velocity mode profile is comprised of three phases of operation: (a) acceleration, (b) coast and (c) deceleration. Finally, when the land crossing Pulse for track n-6 is received, i.e. 6 tracks to go to target, the microprocessor 30 terminates velocity mode operation and switches to position mode operation for the arrival phase of the track seek in accordance with the present invention.

Position Mode—Arrival Phase

Figure 4:
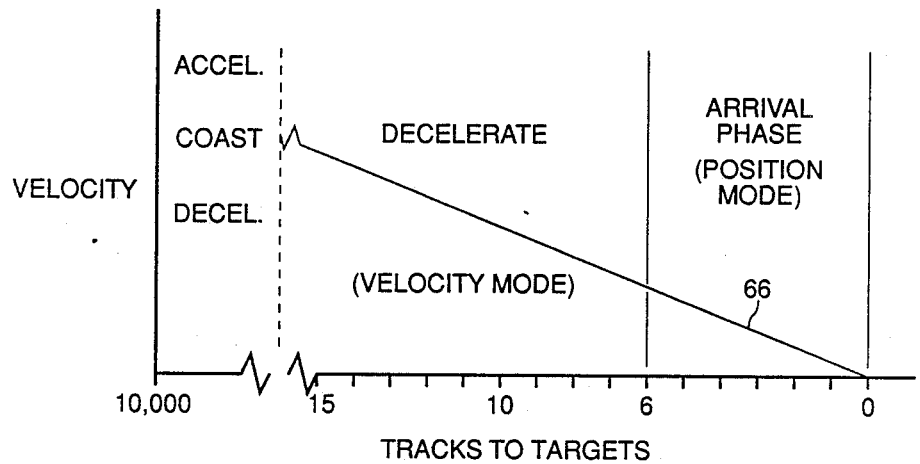
FIG. 4 is graph of a the arrival portion of the velocity seek profile of FIG. 2.

Pseudo-sampled velocity information feedback for the optical or magneto-optical drive system of the type considered herein is considered to be a pragmatic approach to velocity feedback control given the typically poor quality nature of the actual tracking error signal. A disadvantage of this approach, however, is that at low velocities encountered at the end of a seek or during relatively short seeks, the actual-velocity feedback is very coarse, lowering the velocity servo loop bandwidth and undesirably hampering the phase margin of the loop. In accordance with a feature of the present invention, therefore, this is compensated for near the end of the velocity mode seek during low velocity approach to the target track by switching to what is conveniently referred to herein as the "arrival phase" shown schematically in the graph of FIG. 4 as segment 66 beginning at track n-6 of the velocity profile, i.e. six tracks to go to the target track. Referring again to FIG. 1, in the arrival phase of track seek, a pseudo-position algorithm is employed using synchronous demodulator 42 in parallel with phase detector 50 to lock the moving position of head 10 to a synthesized reference tracking error signal from DAC 55 over the final number of tracks leading to the target track. Thus at the beginning of the arrival phase, a SEEK EN~ logic control signal from microprocessor 30 effectively opens a solid state switch 33 and closes a solid state switch 35 to terminate the velocity mode of servo control and to switch the system into a position mode in which the moving position of the head is effectively controlled by the synthetic reference tracking error signal $TE_{sr}$ generated by microprocessor 30 and reference TE DAC 55. Reference signal $TE_{sr}$ is essentially a swept burst frequency sine wave which, during the arrival phase of a long seek, sweeps from a high to low frequency over the space of the track crossings involved in the arrival phase of the seek. The number of track crossings, six in this embodiment, and the starting and ending frequency of the synthetic reference tracking error signal $TE_{sr}$, 12 KHz to 4 KHz are determined by design considerations involving system constraints of the given drive system. It will be appreciated that the desire to have as many track crossings as possible to assure reliable performance of the locking of the head 10 to the synthetic reference signal $TE_{sr}$ must be balanced against the ability of microprocessor 30 to synthesize a tracking error signal at the higher frequencies required as higher numbers of track crossings are attempted to be employed.

Referring jointly to FIGS. 1 and 5, the actual tracking error signal $TE_a$ from head 10 and the synthesized reference tracking error signal $TE_{sr}$ from microprocessor 30 are combined mutually 180° out of phase with each other in difference circuit 40 wherein the tracking error signal $TE_a$ is effectively subtracted from the reference signal $TE_{sr}$. The resultant difference signal is applied to one leg of synchronous demodulator 42 comprised of solid state switch 46 and to the other leg comprised of inverter 44 and solid state switch 48. In the signal waveforms illustrated in FIG. 5, peaks 91 and 92 of signal $TE_{sr}$ are coincident with the desired timing of land and groove crossings, respectively. For signal $TE_a$, which is 180° out of phase with signal $TE_{sr}$, peaks 93 and 94 correspond to the timing of actual groove and land crossings, respectively. In synchronism with the generation of the signal $TE_{sr}$, microprocessor 30 generates a pair of control signals SM—1~ and SM 2~ which are applied to solid state switches 46 and 48 respectively to sample the direct and inverted output difference signals from difference circuit 40. As long as actual tracking error signal $TE_a$ tracks in phase with reference tracking error signal $TE_{sr}$, as represented by the solid line curve 95, the output of difference circuit 40 is zero and no error correction is generated. If signal $TE_a$ begins to fall out of synchronism with signal $TE_{sr}$, as represented by dotted curve 96, error signals 97 and 98 are applied to sampling switches 46 and 48, respectively. The appropriately timed sampling signals SM—1~ and SM—2~ convert these error signals to a combined signal at output terminal 49 in which the ac components are filtered out, schematically represented by capacitor 47, and the remaining dc error component PE is coupled through adder circuit 57 to track follower servo 16 for use in correcting the moving position of head 10 to conform to the desired position represented by reference tracking error signal $TE_{sr}$.

Because synchronous demodulator 50 is capable of operating effectively over only a relatively narrow range of phase error between signals $TE_{sr}$ and $TE_a$, typically less than ±90°, phase-frequency detector 50 is operated in parallel with synchronous demodulator 42. The addition of phase-frequency detector 50 provides a very strong locking function in that it is capable of outputting a continuous dc level error voltage in response to large phase errors that can occur at the lower frequency end of the tracking error signal during which synchronous demodulator 42 becomes less effective. Although only a single phase-frequency detector is shown in the system of FIG. 1, the amount of available error voltage information from the phase-frequency detector side can be doubled by adding another phase-frequency detector, in parallel, thus utilizing one detector for each zero crossing of the actual tracking error signal from head 10.

Position Mode—Short Seek

Because of the time required for phase lock loop circuit 24 to phase lock onto land crossing pulses from detector 18, relativity short seeks of, for example, less than 256 tracks are performed utilizing position mode control similar to that just described rather than the velocity mode control using the velocity mode servo loop through PLL 24. Thus, as previously indicated, before any seek is commenced, microprocessor 30 checks the seek command from the host computer to determine if the seek is less than the predetermined number of tracks, e.g. less than 256 tracks, and, if so, the position mode seek is initiated.

The position mode seek of the present invention utilizes the same method as used in the arrival phase, namely locking the actual tracking error signal from head 10 on a synthesized tracking error signal from microprocessor 30, except that the synthesized tracking error signal now covers all phases of the seek: acceleration, coast (if required) and arrival. Thus at the beginning of position mode seek, a positive acceleration feed forward drive current of appropriate polarity is applied via DAC 14 to amplifier 12 and actuator motor 11. At the same time, microprocessor 30 outputs a synthesized tracking error signal that corresponds to desired movement of the head 10 across the tracks at a linearly increasing velocity that would result from the applied positive acceleration current. In the illustrated embodiment, the synthesized reference tracking error signal begins with a swept burst at an increasing frequency of from 4 KHz to 12 KHz for a period of 6 tracks, the exact opposite of decreasing frequency burst $TE_{sr}$ in FIG. 5 employed in the aforedescribed arrival seek phase. At the end of the sixth track, and assuming the seek is greater than twelve tracks, the feed forward acceleration current is reduced to zero and the frequency of the synthesized reference tracking error signal is held constant at 12 Khz for the coast phase of the seek corresponding to a predetermined constant head velocity, e.g. 22 mm/sec.. This continues until microprocessor 30 determines that track n-6 has been reached at which time the synthesized reference tracking error signal enters the arrival phase with a swept decreasing frequency exactly as described above in connection with the arrival phase of a long seek. Throughout the position mode seek, the actual tracking error signal is maintained locked to the reference tracking error signal (and thus also the movement of head 10) by the position mode feedback loop including synchronous demodulator 42 and phase-frequency detector 50. If the seek is fewer than 12 tracks, the coast phase is eliminated and a lower terminal frequency is reached by the reference tracking error signal at the seek midpoint, at which time the deceleration phase is initiated.

It will be appreciated that what has been disclosed herein is an effective head positioning seek servo system useful in an optical or magneto-optical of the type in which tracking error information derived from the data read beam from surface features of the storage disk, without benefit of dedicated servo data, is effectively utilized for servo feedback control.

The invention has been described in detail with particular reference to a presently preferred embodiment, but it will be understood that variations and modifications can be effected within the spirit and scope of the invention.

What is claimed is:

1. A track seek servo system for moving the head of an optical or magneto-optical disk drive during a seek operation to a target track of an information storage disk on which data is recorded on data tracks comprised of substantially concentric grooves separated by raised land areas, the servo system comprising:

sensing means included in said head for generating an actual tracking error signal derived from transitions between said grooves and land areas and representative of actual movement of the head relative to the data tracks;

means for synthesizing a separate reference tracking error signal corresponding to a tracking error signal which would be generated by said sensing means with said head moving in a desired profile of position versus time across a predetermined number of tracks, said reference tracking error signal having at least one segment of monotonically decreasing frequency representing a desired slowing of head movement across a contiguous series of tracks adjacent the target track at the end of the seek operation;

synchronous demodulator means responsive to said actual and reference tracking error signals for generating a first position error signal representative of deviation in actual position of said head from the desired position as represented by said reference tracking error signal;

phase-frequency detector means responsive to said actual and reference tracking error signals and primarily effective during the low frequency portion of said reference tracking error signal for generating a second position error signal representative of deviation in actual position of said head from the desired position as represented by said reference tracking error signal;

means for combining said first and second position error signals;

and means responsive to said combined error signals for controlling the position of said head to conform to the desired position as represented by said reference tracking error signal.

2. A servo system according to claim 1 in which said synthesized reference tracking error signal includes an initial segment of a monotonically increasing frequency representing a desired linearly increasing velocity of said head across a predetermined number of tracks at the beginning of a seek.

3. A servo system according to claim 2 in which said synthesized reference tracking error signal includes a constant frequency segment between said segments of increasing and decreasing frequency segments, said constant frequency segment representing a period of coasting of said head at a predetermined terminal velocity.

4. A servo system according to claim 1 in which said phase-frequency detector means includes a pair of phase frequency detectors individually operative on zero crossings of opposite polarity in said actual tracking error signal.

5. A method of moving the head of an optical or magneto-optical disk drive during a seek operation comprising:

generating in said head an actual tracking error signal from transitions between data grooves and land areas on an information storage disk, said actual tracking error signal being representative of actual movement of the head relative to the data tracks;

synthesizing a separate reference tracking error signal corresponding to a tracking error signal which would be generated with said head moving in a desired profile of position versus time across a predetermined number of tracks, said reference tracking error signal having at least one segment of monotonically decreasing frequency representing a desired slowing of head movement across a contiguous series of tracks adjacent the target track at the end of a seek operation;

synchronously demodulating said actual and reference tracking error signals to generate a first position error signal representative of deviation in actual position of said head from the desired position as represented by said reference tracking error signal;

phase-frequency detecting said actual and reference tracking error signals in parallel with said synchronous demodulating operation at least during the low frequency portion of said reference tracking error signal to generate a second position error signal representative of deviation in actual position of said head from the desired position as represented by said reference tracking error signal;

combining said first and second position error signals to generate a composite position error signal;

and applying said composite error signal to head actuating means to control the position of said head to conform to the desired position as represented by said reference tracking error signal.

6. The method of claim 5 in which the reference tracking error signal is synthesized across the entire length of seek of said head and includes an initial segment of monotonically increasing frequency which is the mirror image of said segment of decreasing frequency and in which the decreasing frequency segment is at the end of the seek.

7. The method of claim 6 in which the reference tracking error signal is synthesized with a segment of constant frequency between said segments of increasing and decreasing frequency to represent coasting of said head at a desired predetermined terminal velocity.

* * * * *